United States Patent
Gray et al.

(10) Patent No.: US 6,704,734 B2
(45) Date of Patent: Mar. 9, 2004

(54) TUPLE SPACE OPERATIONS FOR FINE GRAINED SYSTEM CONTROL

(75) Inventors: Thomas Gray, Carp (CA); Daniel Amyot, Hull (CA); Oriane Leger, Cornwall (CA); Wendy Young, Swastika (CA); Wayne Young, New Liskeard (CA); Ian Lakins, Kingston (CA); John Day, Kingston (CA); Colin Banger, Kingston (CA); David Athersych, Kingston (CA)

(73) Assignee: Mitel Knowledge Corporation (CA)

(*) Notice: Subject to any disclaimer, the term of this patent is extended or adjusted under 35 U.S.C. 154(b) by 0 days.

(21) Appl. No.: 10/339,836

(22) Filed: Jan. 10, 2003

(65) Prior Publication Data

US 2003/0135515 A1 Jul. 17, 2003

(30) Foreign Application Priority Data

Jan. 14, 2002 (GB) .............................. 0200745

(51) Int. Cl.⁷ ............................................. G06F 17/30
(52) U.S. Cl. ........................................ 707/10; 707/102
(58) Field of Search ........................... 707/10, 4, 102, 707/103 R; 706/1, 20; 709/201; 711/28

(56) References Cited

U.S. PATENT DOCUMENTS

| | | | |
|---|---|---|---|
| 5,893,108 A | | 4/1999 | Srinivasan et al. |
| 6,606,610 B1 | * | 8/2003 | Gray et al. .................. 706/1 |
| 2003/0005032 A1 | * | 1/2003 | Liscano et al. ............. 709/201 |
| 2003/0135515 A1 | * | 7/2003 | Gray et al. .................. 707/102 |
| 2003/0135695 A1 | * | 7/2003 | Gray et al. .................. 711/128 |
| 2003/0200187 A1 | * | 10/2003 | Gray et al. .................. 706/20 |

OTHER PUBLICATIONS

"Design and Implementation of a Tuple Space Service for Java", MS Project, CSC 9020, Andrw B. Sudell, Dec. 10, 1998, See HTML version at: http://www.op.net/asudell/is/linda/linda.html.

"St. Lawrence Student Projects to be Patented by Mitel Networks", College Magazine, "St. Lawrence College Voyageur/Fall 2001". See HTML version at: http://www.s-l.on.ca/alumni/voyageur/voy01F05.htm.

Campbell, D.K.G. et al., "LINDA for Case Base Retrieval: A Case for Extending the Functionality of LINDA and its Abstract Machine", System Sciences, 1998, Proceedings of the Thirty-First Hawaii International Conference on Kohala Coast, HI, USA, Jan. 6–9, 1998, Los Alamitos, Ca, USA, IEEE, Comput. Soc, US, Jan. 6, 1998, pp. 226–235.

Perlin, M., "Scaffolding the RETE Network", Proceedings of the International Conference on Tools for Artificial Intelligence, Herndon, Nov. 6–9, 1990, Los Alamitos, CA, IEEE, Computer Soc, US, vol. Conf. 2, Nov. 6, 1990, pp. 378–385.

Holvoet, T., et al. "Towards Generative Software Composition", System Sciences, 1998, Proceedings of the Thirty-First Hawaii International Conference on Kohala Coast, HI, USA Jan. 6–9, 1998, Los Alamitos, CA, USA, USA, IEEE, Comput. Soc, US, pp. 245–254.

* cited by examiner

Primary Examiner—Diane B. Mizrahi
(74) Attorney, Agent, or Firm—Jones Day

(57) ABSTRACT

According to the present invention, a plurality of new tuple-space operators is provided for enhancing the capability of tuple spaces to provide fine-grained control of presence and location systems. New Deactivate/Activate and Mass Timer Extension operators may be applied simultaneously to large numbers of tuples and anti-tuples, thereby improving system responsiveness. A new Query operator greatly increases the ability of presence and location systems to guarantee that private information in the tuple space remains private.

13 Claims, 1 Drawing Sheet

TUPLE SPACE OPERATIONS FOR FINE GRAINED SYSTEM CONTROL

FIELD OF THE INVENTION

This invention relates generally to global associative memory systems, and more particularly to an extended operating set for improved performance of tuple space fine grained system control.

BACKGROUND OF THE INVENTION

Tuple spaces provide a unique form of flexibility in the sharing of information and the coordination of applications. As described in greater detail below, tuples are collections of key-value pairs stored in a tuple space that can be queried based on the matching of anti-tuples by tuples. The original Linda model by David Gelernter (N. Carriero and D. Gelernter, "Linda in context", *Communications of the ACM*, 32(4):444–458, April 1989) has found widespread use in collaboration of distinct functional entities. Traditional tuple space operations are performed on single tuples as coordinating mechanisms for providing coarse-grained control. However, such prior art systems are unsuitable for providing fine-grained control of system operation.

For example, the inventors have contemplated the application of tuple spaces to the operation of presence and location systems that require fine-grained operations in which large numbers of tuples are issued and retracted for each state change of the system. Consequently, there is a need to extend the traditional tuple space operations to accommodate the high-speed issuance and retraction of large numbers of tuples and anti-tuples.

SUMMARY OF THE INVENTION

According to the present invention, a plurality of new tuple-space operators is provided for enhancing the capability of tuple spaces to provide fine-grained control of presence and location systems. New Deactivate/Activate and Mass Timer Extension operators may be applied simultaneously to large numbers of tuples and anti-tuples, thereby improving system responsiveness. A new Query operator greatly increases the ability of presence and location systems to guarantee that private information in the tuple space remains private.

More particularly, in the original Linda model tuples and anti-tuples are inserted and removed from the tuple space one at a time by the various operators. This has been found to be unsatisfactory for fine-grained control of a system since any system state change may require the removal and insertion of large numbers of tuples. The new Deactivate/Activate operation either activates or deactivates all tuples that match a template, in a single operation. Tuples are not removed or inserted, as in the prior art, but are marked with a newly defined flag that indicates that they either should or should not be subject to matching. This greatly enhances the responsiveness of the tuple space when used for fine-grained control.

Many extensions of Linda have addressed the problem of tuple "garbage collection" by providing individual tuple timers that remove orphan tuples at their expiry times. This solution is adequate but timers are notoriously difficult to manage. A timeout that is too short will destabilize the standard operation of a system while a timeout that is too long wastes valuable tuple memory. The new Mass Timer Extension operation automatically extends the timeout period for all tuples that match a particular template.

Finally, tuple spaces are ideal for the sharing of information about human beings as well as applications. Indeed it is contemplated that tuple spaces will be increasingly used in open environments with users in who are related in no other way to each other than by the use of the tuple space. In such situations, there is a danger of malfeasance by malicious users who may attempt to illicitly use the tuple space. A major example of this is in the case of presence systems in which private information about individuals is shared with trusted parties. It is important in such situations that this information be protected against the inquiries of malicious parties. The new Query operation returns a list of all anti-tuples that are looking for tuples that match a specific template, which can be used, for among other things, to identify all anti-tuples that match a specific individual's presence tuples. Unauthorized anti-tuples can be detected by this operation and removed. The Query operator does not have to rely on detecting the activity of the malicious user when he/she inserts an offending anti-tuple, which makes the systems very robust in face of privacy attacks The new operations provided according to the present invention enable tuple spaces to be used as the base platform for call processing architectures providing addition and creation of features on the fly.

BRIEF DESCRIPTION OF THE DRAWINGS

A detailed description of the invention is set forth herein below, with reference to the sole drawing, which is a block diagram of a hardware-assisted tuple space for implementing the tuple space with extended operations according to the preferred embodiment.

DETAILED DESCRIPTION OF THE PREFERRED EMBODIMENT

Figure 1:
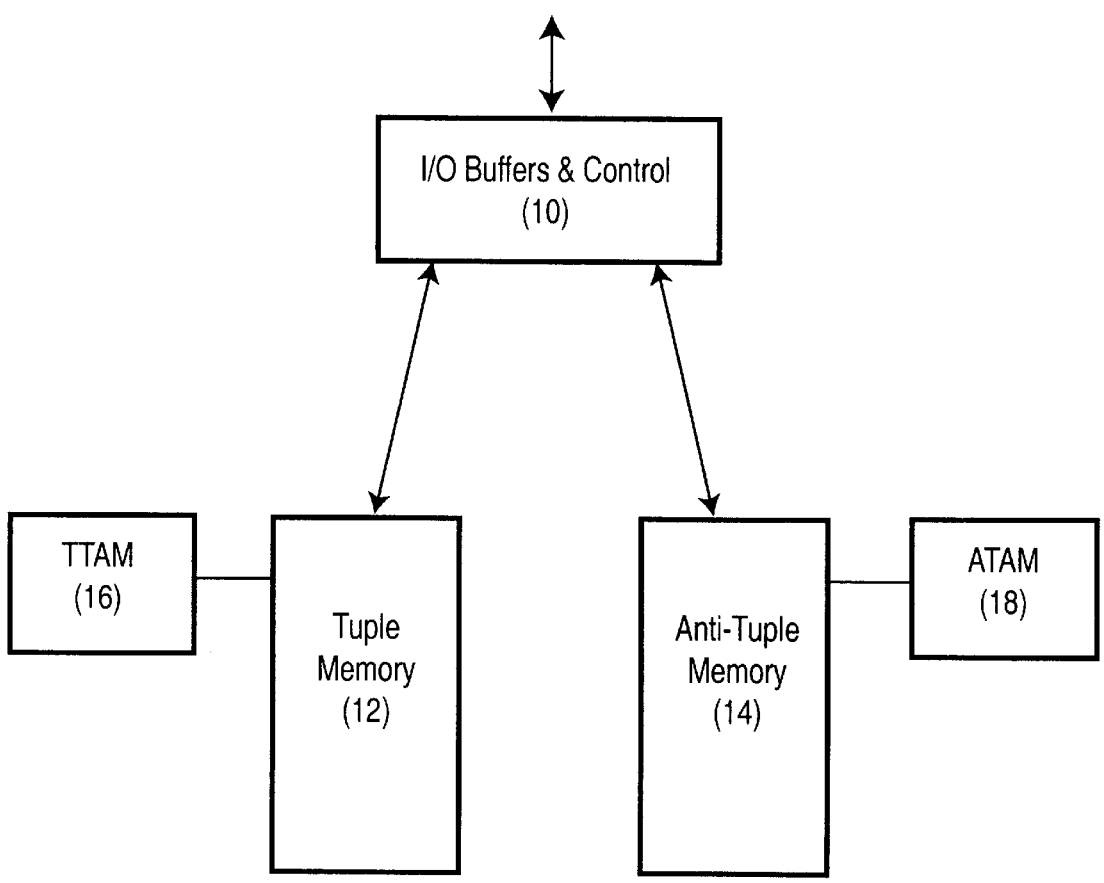

Before discussing the invention is detail, a brief introduction is set forth below to the basic structure and operation of a tuple space.

A tuple space is a set of type/value ordered pairs called ingles. Each ingle consists of a type (e.g. Name) and a value (e.g. John Doe). Thus, a tuple which describes an employee for a company could, for example, be:

{:name John Doe :age 37 :employee_number 12345 :start_date 810126 :position T12}

The tuple space enables coordination by allowing queries based on the matching of tuples by anti-tuples. An anti tuple is a tuple that can be used as a query in the tuple space. In form, it is identical to a tuple except that the value of any or all fields may be replaced by a '?' which indicates a 'don't care' condition. Tuple spaces are set up to match tuples with anti-tuples which agree in all fields except for that one indicated by the '?' query. Thus the anti tuple:

{:name ?:age 37 :employee_number ?:start_date ?:position T12} would return the tuples for all employees of position T12 who are 37 years old.

Conventional operations on the tuple space consist of:
- Poke—place a tuple in the tuple space. Duration may be specified for how long this tuple should remain in the space. This may be any period up to indefinite.
- Peek—query the tuple space with an anti-tuple. This query may be specified to last for any period up to indefinite. Copies of matching tuples will be returned through the interface and the tuples remain in the tuple space.

Pick—query the tuple space with an anti-tuple. This query may be specified to last for any period up to indefinite. Copies of matching tuples will be returned through the interface and the tuples are removed from the tuple space.

Cancel—with the specified anti-tuple, remove all matching anti-tuples from the tuple space. Tuples themselves may be removed directly by an appropriate pick request.

Turning to the block diagram, a hardware-based tuple space is shown for implementing the extended operations according to the present invention. An I/O Buffers and Control block 10 is provided including Input/Output Buffers, Search Logic and Memory Management components. The I/O Buffers link the device to the outside environment. The Search Logic and Memory Management functions perform general memory control for the device and conduct all searches. A tuple memory 12 is provided to store tuples and an anti-tuple memory 14 is provided to store anti-tuples, both of which may either be implemented using conventional RAM or in software. Multiple sessions can be set up wherein tuples and anti-tuples are passed into the space and tuples and anti-tuples are returned as a result of the operations. Within a single session tuples and anti-tuples are passed into the space along with the desired operator. According to the present invention, the following information is passed with the tuple/anti-tuple: Operator, Tuple/Anti-tuple, and Time to Live parameter. The Search Logic of block 10 searches the tuple space and performs the indicated operations by means of special delimiting flags, assignment on fixed relative memory locations such as word boundaries, as discussed in greater detail below.

In order to address the speed problems associated with using conventional RAM for sequential searching, tuple attributes are stored in an array and are used to provide a mechanism whereby impossible tuple matches (differing numbers of key-value pairs) can be identified without having to search for the tuple in memory. Specifically, tuple attribute array memory (TAM) is provided that contains important attributes of the stored tuples and anti-tuples. Two specific TAMs are provided—the tuple TAM (TTAM 16) for tuple storage and the anti-tuple TAM (ATAM 18) for anti-tuple storage.

The structure of the data in each TAM is as follows:

| | |
|---|---|
| Number of Key-Value Pairs | Number of key-value pairs in the tuple |
| Activated Flag | If set the tuple is activated and can be used in a search process. If not set, the tuple is inactive and will be excluded from any search process. |
| Starting address | Location in memory for the start of the tuple |
| Tuple Length | Length of tuple in words |
| Time Out Value | Absolute system time when tuple is to be automatically cancelled |
| Cancel Flag | Set if the tuple is to cancelled and removed from memory |

The TAM arrays 16 and 18 can be used to speed up the matching process of the tuple space. In particular, each TAM array holds information about the tuple in addition to the starting point in memory. Tuples/anti-tuples will match only if they contain the same number of key value pairs. This information can be obtained easily from the incoming tuple/anti-tuple and matched against the information in the array. Only the tuples in which the numbers of key/value pairs match are considered for further matching by accessing the tuples themselves in memory.

Thus, by having tuples that differ in the number of key-value fields to identify specific classes, only those tuples with the same number of these fields will be compared. By deliberately sizing tuples to differentiate them according to class, enhanced search speed is achieved.

According to the present invention, tuples and anti-tuples may be activated or deactivated by using the ACT and DEACT operators (i.e. marked so that they will be included in or excluded from the matching process). If the activated flag is set the tuple is included in the matching process. If it is not set then it is excluded from the process. Use of the ACT and DEACT operators improves system speed and responsivity for applications in which large numbers of tuples or anti-tuples are used for collaboration in different system states. Instead of wasting time removing and entering tuples and anti-tuples at each change of state, they may be activated or deactivated en masse.

Tuples and anti-tuples are stored in their respective memories 12 and 14 in contiguous groupings starting at the top of each memory. All lower tuples are moved up to fill in the gaps in the groupings created by cancelled tuples. New tuples are then inserted at the bottom of the memory. When a new tuple of unknown length is obtained, no action needs to be taken to find an appropriately sized space in memory to hold it, in contrast with the prior art hardware-based systems discussed above. Instead, the tuple is placed at the bottom of the memory. This is also in contrast to software-based memory management techniques in which fragmentation is a major and common problem consuming much real time processing.

By tracking a Time Out Value for each tuple, an efficient timer-based garbage collection process is provided to handle the problem of orphan tuples whose owner objects have terminated or erroneously forgotten about them. These tuples can fill the memory, which causes management problems requiring software intervention and periodic re-initiation of the space. According to the present invention the Time Out Values are implemented in hardware. Expired tuples are simply marked as cancelled and then removed from memory automatically by the Memory Management process of block 10, as described in greater detail below.

Tuples are stored in the tuple memory 12 such that individual keys and values may be determined by the Search Logic of block 10. There are several well-known methods for accomplishing this function, including the use of special delimiting flags, assignment on fixed relative memory locations such as word boundaries, etc. The details of how tuples are determined are not important to the present invention. A particular implementation is set forth below.

Operation of the hardware-assisted tuple space with which the operators of the present invention are applied, is set forth below with reference to a typical Pick operation. The operations for Poke, Peek and Cancel are similar and would be obvious to a person skilled in the art upon reading this specification.

With the Peek operation, an anti-tuple is received from an external process and placed in the Input/Output buffers of block 10. The attributes described above for the incoming anti-tuple are then extracted and matched in turn by the Search Logic of block 10 against the attributes of the tuples stored in TTAM 16. Initially the state of the ACTIVATE flag is checked. If for a particular tuple it is not set, the tuple is deactivated and is not to be used for matching as described above. In this case the search moves to the next tuple. If for this next tuple the ACTIVATE flag is set, the tuple is to be used for matching, etc. Next, the Number of Key-Value Pairs attributes of the anti-tuple and selected tuple are compared.

If these do not match then there is no possibility of a tuple match and the search moves to the next tuple in turn. It will be seen that matching attributes results in a quick search that increases the overall speed of the search by excluding impossible matches.

The ordering of these checks is not important and may be reversed in implementation. Analysis of specific applications may reveal that more time in searching may be saved in searching by one ordering sequence or another. This ordering is therefore application specific and may be optionally selected by the user with logic in the device if needed.

If the preliminary match succeeds, the Search Logic executes a conventional sequential search wherein keys and values for the tuple are extracted in turn from the tuple memory 12 and matched against the corresponding locations in the received anti-tuple. This matching begins at the location in memory indicated by the TTAM starting address attribute for the tuple. The search continues location-by-location until either the end of the tuple is reached, which indicates that a match has been found, or the first mismatch is found. If a mismatch is found then the Search Logic examines the next tuple. Since this is a Pick operation, if a match is found a copy of the tuple is moved to the I/O Buffers and the Cancel flag is set in the TTAM location for the matched tuple. The tuple value in I/O is used at the end of the process to return the matched tuple to the requesting process. The set Cancel flag indicates to the Search Logic that the tuple is to be removed from memory (described in detail below with reference to the memory management section). The search continues tuple-by-tuple until all of the tuple attributes in TTAM 16 have been checked.

At the end of the process the attributes of the received anti-tuple are placed at the bottom of the ATAM memory 18 and the anti-tuple itself is placed at the bottom of the anti-tuple memory 14. The memory management process is then applied to the contents of the tuple memory and the ATAM memory, as described in greater detail below.

The algorithms set forth above can be used in parallel across more than one copy of the memory elements in the block diagram. In such as case, the TAM, ATAM tuple memory and anti-tuple memory elements are replicated as needed and the I/O element is modified to accommodate returned tuples from all of the memory blocks and to select the most suitable memory block to store the incoming tuple or anti-tuple.

When the DEACT or ACT operator is introduced into the space, it is matched against the attributes in ATAM memory 18. Any attribute which matches the template will have its Activate flag reset to the appropriate state. In subsequent searches when new tuples are submitted, attributes for the anti-tuples with the Activate flag reset by a DEACT operator will not be matched against the tuple. In matching a newly submitted tuple with a stored anti-tuple, the state of the ASSOCIATED Activate flag is checked before field-by-field tuple matching is performed. If the Activate flag has been reset by the DEACT operator, the matching process is aborted.

The process for activating and deactivating tuples follows an identical pattern with matching of newly submitted anti-tuples with tuples dependent on the state of the Activate flag stored with the tuple attribute in TTAM 16.

The structure of the new operators according to the present invention is as follows:

OPERATOR [Optional Parameters] Tuple or Anti-tuple

Thus, the DEACT operator for a tuple is of the form:

<DEACT_FLAG><NUMBER OF FIELDS><TUPLE>

The ACT operator for a tuple is of the form:

(ACT FLAG><NUMBER OF FIELDS><TUPLE>

The ACT and DEACT operators for anti-tuples follows the same format.

As discussed above, for fine-grained control typically a large number of tuples and anti-tuples are active in a specific state. Also, there are typically multiple states for the system. The Deactivate/Activate flag allows for a many tuples and anti-tuples to be activated or deactivated within the tuple space without requiring that they be placed into the space one at a time by the appropriate post, pick or peek operations. Consequently, state change context switching can be done in much less time than is possible according to the prior art. In a typical application, all tuples and anti-tuples for all states are input to the tuple space at set-up time in a manner similar to an initial program load. The tuples are then only deactivated and activated as needed.

As discussed above, tuples and anti-tuples are supplied with a time to live parameter (i.e. Time-Out Value stored in TAM). This is conventional and is found in many implementations in order to preserve the performance of the tuple space against orphan tuples and anti-tuples which have been placed into the space and are no longer needed. This is analogous to garbage collection in object-oriented systems (i.e. objects that are not in use are autonomously removed). Likewise, in the present invention an autonomous process searches both the tuple memory and anti-tuple memory for tuples and anti-tuples that have expired. If the search detects that a tuple or anti-tuple has a time to live parameter that is earlier than the current system time, it is removed.

However, according to the present invention, specific operators are provided: one to extend tuples (TUPLE EXTEND) and the other to extend anti-tuples (ANTI-TUPLE EXTEND).

Each operator is issued with a parameter that indicates the amount of time that the tuple or anti-tuple is to be extended. Thus, in the situation where a process may wish to extend the life of its tuples and anti-tuples the operator is supplied with a template (i.e. the structure of the fixed and don't care fields) that is matched against tuples or anti-tuples as needed.

On the occurrence of matched tuples or anti-tuples, the time to live field receives the value of the extension field in the incoming operator added to it.

The structure of the TUPLE EXTEND operator is as follows:

<TUPLE_EXTEND><EXTENSION VALUE><TUPLE>

The structure of the ANTI-TUPLE EXTEND is as follows:

<ANTI-TUPLE EXTEND><EXTENSION VALUE><ANTI-TUPLE>

The Mass Timer Extension of the present invention allows large numbers of tuples or anti-tuples to be identified at one time and to have their time to live parameters extended. In conventional systems this process is required to be performed one tuple/anti-tuple at a time with the appropriate post, peek and pick operators thereby decreasing the responsivity of the system and making it less suitable for fine-grained operation.

The Query operation according to the present invention is very valuable for tuple spaces that are used for private information and/or are used in an open environment. In such environments, it is possible for an intruder to insert an anti-tuple in the space in order to retrieve private information about a person (e.g. the person's location, which could be used by a stalker to track a victim). The Query operator provides a fail-safe mechanism to overcome this problem. QUERY searches through the anti-tuple memory and returns all anti-tuples which match the template supplied with the operator. Thus, using the example tuple given above, John Doe whishes to find all anti-tuples that are subscribed to his name, he can use this operator with a template that has his name as fixed and the remainder as "don't cares".

If the QUERY operator detects an unauthorized anti-tuple, the process removes the anti-tuple using a Cancel operation and reports the infraction to a management application. Thus, the Query operator provides a fail safe enforcement strategy that detects and removes all illicit anti-tuples.

Variations and modifications of the invention are contemplated.All such alternative embodiments are believed to fall within the sphere and scope of the invention as defined by the appended claims.

What is claimed is:

1. A method of operating a tuple space implemented in memory, comprising:

storing tuples of key-value pairs of data;

storing anti-tuples of key-value pairs of data;

storing selected attributes of respective ones of said tuples and anti-tuples, wherein said selected attributes each include at least an activate flag which activates respective ones of said tuples and anti-tuples when set and deactivates respective ones of said tuples and anti-tuples when reset;

operating on said attributes to selectively activate and deactivate said tuples and anti-tuples conforming to a predetermined template;

performing preliminary searches of said selected attributes to identify only said tuples and anti-tuples for which said activate flag is set as possible matching tuples and anti-tuples; and comparing said key-value pairs of said possible matching tuples and anti-tuples to identify actual matching tuples and anti-tuples.

2. The method of claim 1, wherein said step of operating on said attributes comprises applying one of either an ACT or DEACT operator to said activate flag.

3. The method of claim 2, wherein said DEACT operator applied to a tuple attribute is of the form <DEACT_FLAG><NUMBER OF FIELDS><TUPLE>.

4. The method of claim 2, wherein said DEACT operator applied to an anti-tuple attribute is of the form <DEACT_FLAG><NUMBER OF FIELDS><ANTI-TUPLE >.

5. The method of claim 2, wherein said ACT operator applied to a tuple attribute is of the form <ACT_FLAG><NUMBER OF FIELDS><TUPLE>.

6. The method of claim 2, wherein said ACT operator applied to an anti-tuple attribute is of the form <ACT_FLAG><NUMBER OF FIELDS><ANTI-TUPLE>.

7. The method of claim 1, further comprising the step of defining a time-out value as one of said attributes representing the absolute system time when respective ones of said tuples and anti-tuples are to be automatically cancelled from said tuple space.

8. The method of claim 7, further comprising the step of operating on said attributes to selectively extend said time-out value.

9. The method of claim 8, wherein said step of operating on said attributes comprises applying one of either an TUPLE EXTEND or ANTI-TUPLE EXTEND operator to said time-out value.

10. The method of claim 9, wherein said TUPLE EXTEND operator is of the form <TUPLE_EXTEND><EXTENSION VALUE><TUPLE>.

11. The method of claim 9, wherein said ANTI-TUPLE EXTEND operator is of the form <ANTI-TUPLE_EXTEND><EXTENSION VALUE><ANTI-TUPLE>.

12. A method of operating a tuple space implemented in memory, comprising:

storing tuples of key-value pairs of data;

storing anti-tuples of key-value pairs of data;

comparing said key-value pairs to identify matching tuples and anti-tuples; and performing an operation on said anti-tuples to return all anti-tuples conforming to a predetermined template.

13. The method of claim 12, wherein said step of performing said operation on said anti-tuples comprises issuing a QUERY operator of the form <QUERY><TEMPLATE><ANTI-TUPLE>.

* * * * *